(12) United States Patent
Heck et al.

(10) Patent No.: US 9,575,341 B2
(45) Date of Patent: Feb. 21, 2017

(54) SOLID STATE LIDAR CIRCUIT WITH WAVEGUIDES TUNABLE TO SEPARATE PHASE OFFSETS

(71) Applicant: Intel Corporation, Santa Clara, CA (US)

(72) Inventors: John Heck, Berkeley, CA (US); Jonathan K Doylend, Morgan Hill, CA (US); David N Hutchison, Santa Clara, CA (US); Haisheng Rong, Pleasanton, CA (US); Jacob B Sendowski, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/318,604

(22) Filed: Jun. 28, 2014

(65) Prior Publication Data

US 2015/0378187 A1    Dec. 31, 2015

(51) Int. Cl.
| | | |
|---|---|---|
| *G02F 1/13* | (2006.01) | |
| *G01S 17/42* | (2006.01) | |
| *G01S 17/89* | (2006.01) | |
| *G01S 7/481* | (2006.01) | |
| *G02B 6/12* | (2006.01) | |

(Continued)

(52) U.S. Cl.
CPC ........... *G02F 1/1326* (2013.01); *G01S 7/4817* (2013.01); *G01S 17/42* (2013.01); *G01S 17/89* (2013.01); *G02B 6/12004* (2013.01); *G01S 17/10* (2013.01); *G01S 17/325* (2013.01); *G02B 2006/12061* (2013.01); *G02B 2006/12147* (2013.01)

(58) Field of Classification Search
CPC ........ G01S 17/10; G01S 17/325; G01S 17/42; G01S 17/89; G01S 7/4817; G02B 2006/12061; G02B 2006/12147; G02F 1/1326

See application file for complete search history.

(56) References Cited

U.S. PATENT DOCUMENTS

| | | | |
|---|---|---|---|
| 7,315,665 B1 * | 1/2008 | Anderson | ............. G02F 1/0136 349/18 |
| 7,339,727 B1 | 3/2008 | Rothenberg et al. | |

(Continued)

OTHER PUBLICATIONS

International Search Report and Written Opinion for PCT Patent Application No. PCT/US2015/037988, Mailed Sep. 22, 2015, 14 pages.

(Continued)

*Primary Examiner* — Francis M Legasse, Jr.
(74) *Attorney, Agent, or Firm* — Compass IP Law

(57) ABSTRACT

A solid state photonics circuit having a liquid crystal (LC) layer for beam steering. The LC layer can provide tuning of an array of waveguides by controlling the application of voltage to the liquid crystal. The application of voltage to the liquid crystal can be controlled to perform beam steering with the light signal based on different tuning in each of the waveguides of the array. The waveguides are disposed in a substrate having an oxide or other insulating layer with an opening. The opening in the oxide layer exposes a portion of a path of the array of waveguides. The waveguides are exposed to the liquid crystal through the oxide opening, which allows the voltage changes to the liquid crystal to tune the optical signals in the waveguides.

19 Claims, 9 Drawing Sheets

(51) Int. Cl.
*G01S 17/10* (2006.01)
*G01S 17/32* (2006.01)

(56) References Cited

U.S. PATENT DOCUMENTS

| | | | |
|---|---|---|---|
| 7,406,220 | B1 | 7/2008 | Christensen et al. |
| 7,428,100 | B2 | 9/2008 | Smith et al. |
| 7,436,588 | B2 | 10/2008 | Rothenberg et al. |
| 7,489,870 | B2 | 2/2009 | Hillis et al. |
| 7,532,311 | B2 | 5/2009 | Henderson et al. |
| 7,555,217 | B2 | 6/2009 | Hillis et al. |
| 2003/0160292 | A1 | 8/2003 | Takagi |
| 2005/0271325 | A1* | 12/2005 | Anderson ............... G02F 1/295 385/40 |
| 2006/0055865 | A1* | 3/2006 | Chuang ................ G02F 1/1326 349/196 |
| 2009/0030390 | A1 | 1/2009 | Hammons et al. |
| 2009/0116781 | A1 | 5/2009 | Ichikawa |
| 2013/0004119 | A1 | 1/2013 | Yin et al. |
| 2013/0016939 | A1 | 1/2013 | Takagi |
| 2015/0378241 | A1 | 12/2015 | Eldada |
| 2016/0047901 | A1 | 2/2016 | Pacala et al. |

OTHER PUBLICATIONS

Daniel Kravitz, et al, High-Resolution Low-Sidelobe Laser Ranging Based on Incoherent Pulse Compression, IEEE Photonics Technology Letters, vol. 24, No. 23, December 1, 2012, 3 pages.

J. C. Hulme, et al, Fully integrated hybrid silicon two dimensional beam scanner, Mar. 9, 2015 | vol. 23, No. 5 | DOI:10.1364/OE.23.005861 | Optics Express 5862, 14 pages.

J. K. Doylend et al, Hybrid III/V Silicon Photonic Source With Integrated 1D Free-Space Beam Steering, Optics Letters 37 (20), p. 4257-9 (2012).

J. K. Doylend, et al, Hybrid silicon free-space source with integrated beam steering, Silicon Photonics VIII, edited by Joel Kubby, Graham T. Reed, Proc. of SPIE vol. 8629, 9 pages.

J. Sun et al, Large-Scale Nanophotonic Phased Array, Nature 493, p. 195-9 (2013).

L. Liao, et al. 40 Gbit/s silicon optical modulator for highspeed applications, Electronics Letters 25th Oct. 2007 vol. 43 No. 22, 2 pages.

Steven Johnson, et al, Range Precision of Direct Detection Laser Radar Systems, Laser Radar Technology and Applications IX, edited by Gary W. Kamerman, Proceedings of SPIE vol. 5412, 15 pages.

* cited by examiner

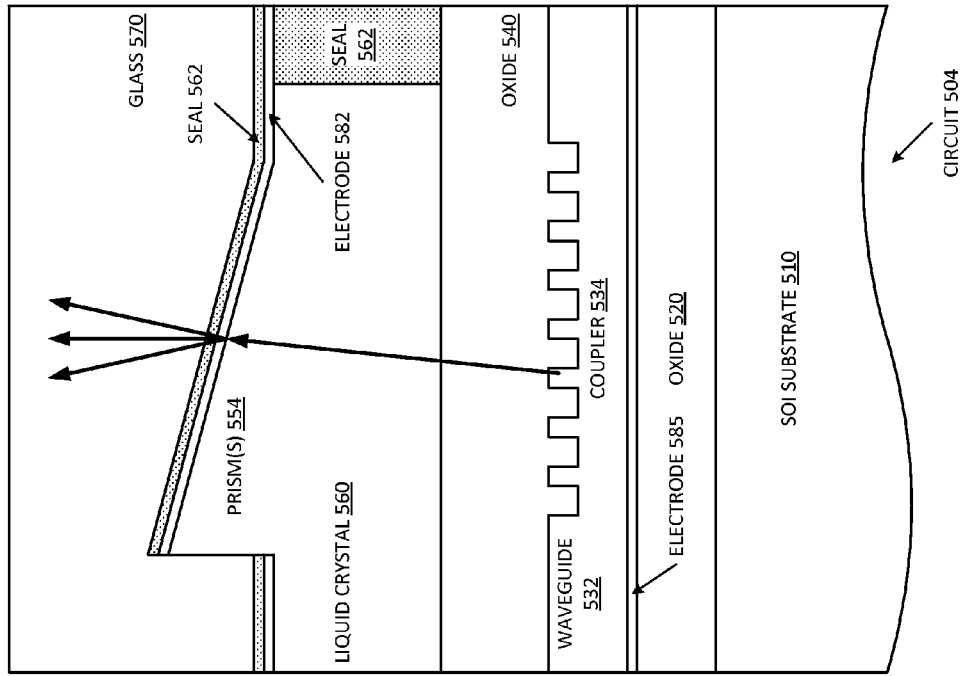
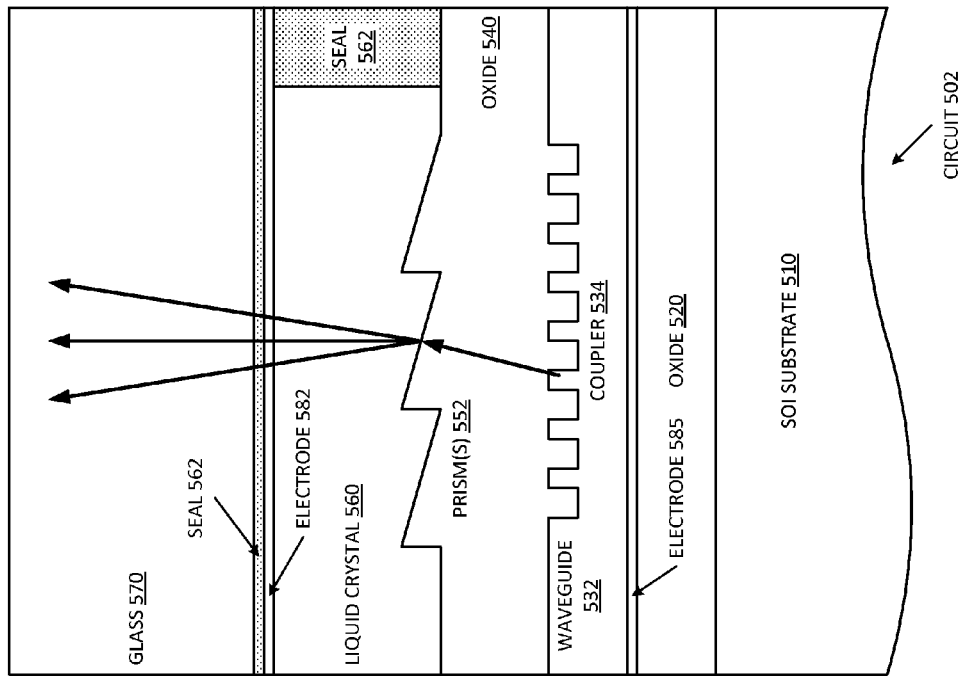

SOLID STATE LIDAR CIRCUIT WITH WAVEGUIDES TUNABLE TO SEPARATE PHASE OFFSETS

FIELD

Embodiments of the invention are generally related to optical devices, and more particularly to LIDAR (light detection and ranging) devices.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2014, Intel Corporation, All Rights Reserved.

BACKGROUND

There is an increasing demand for three dimensional (3D) video or image capture, as well as increasing demand for object tracking or object scanning. However, traditional methods of 3D imaging have significant drawbacks. LIDAR (light detection and ranging) systems are currently very expensive because they require precise assembly of expensive components. Additionally, because traditional 3D imaging systems require mechanical motion to scan the field of view, they tend to be bulky and power hungry.

A basic LIDAR system includes one or more light sources and photodetectors, a means of either projecting or scanning the light beam(s) over the scene of interest, and control systems to process and interpret the data. There are different technologies that can be applied for 3D imaging. Non-laser-based methods are based on stereoscopy or structured light, but they consume significant power to illuminate the entire scene at once, and work poorly in well-lit conditions such as bright daylight. Ultrasonic methods have relatively very poor spatial resolution. Laser light can be broadcast over the field of view, but then suffers from many shortcomings (power is used to illuminate the entire scene at once rather than being concentrated on one spot at a time, thus costing extra power), while directed laser light requires steering, which traditionally would rely on precision mechanical parts.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 5A is a block diagram of an embodiment of a LIDAR circuit with an angled facet.

FIG. 5B is a block diagram of another embodiment of a LIDAR circuit with an angled facet.

Figure 1:
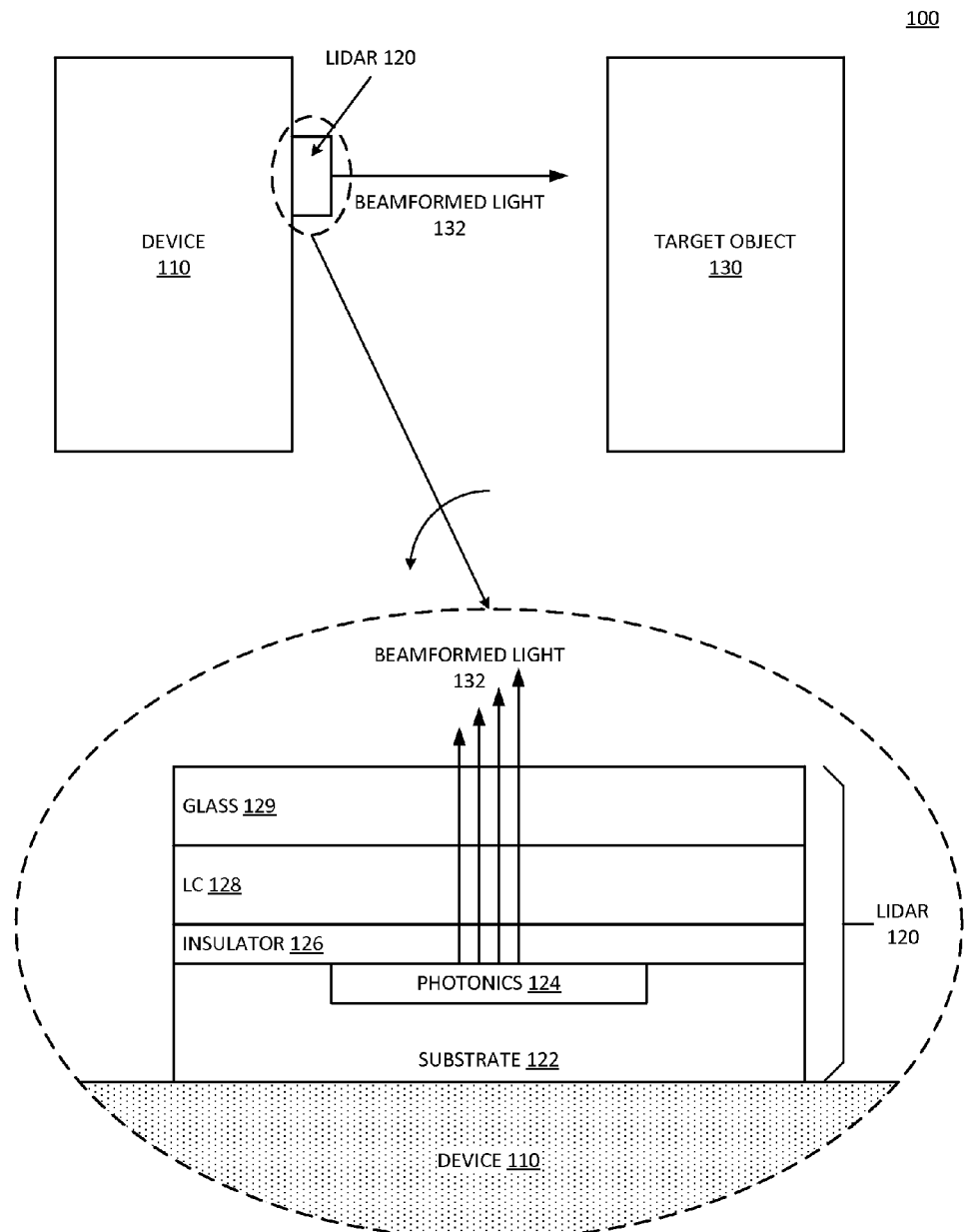
FIG. 1 is a block diagram of an embodiment of a system with an integrated solid state LIDAR circuit.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a solid state photonics circuit includes an array of waveguides disposed in either a semiconductor or an insulator, and a liquid crystal (LC) layer (which can specifically be liquid crystal on silicon (LCOS) when silicon photonics are used) selectively adjacent to the waveguides. The waveguides have an adjacent insulating layer (e.g., oxide), where the insulating layer has an opening to expose the array of waveguides to the LC layer. The LC layer can provide tuning for the array of waveguides by controlling the application of voltage to the liquid crystal. The voltage applied to the LCOS can separately tune all the waveguides. Applying different voltages to the LCOS can create phase shifts to steer the beam of laser light passing through the waveguides. In one embodiment, the opening in the insulator exposes more or less of different waveguides to produce a different phase shifting effect for each different waveguide.

The use of solid state photonics allows the integration of photonics components in a semiconductor substrate (e.g., silicon-based photonics in a silicon substrate). The photonics components can include waveguides and combiners for routing light, passive elements that enable phased arrays for beam forming, one or more couplers to redirect light perpendicular to the photonics substrate, and can include lasers, modulators, and/or detectors. In one embodiment, the semiconductor photonics is silicon based, which allows the use of a standard silicon photonic transmitter wafer. The standard silicon photonics processing can be extended to process liquid crystal onto the silicon photonics. The LC enables a voltage-dependent change in the refractive index, which can enable both x and y beam steering or beam forming.

A basic LIDAR system includes one or more laser sources and photodetectors, a means of scanning the beam(s) over the scene of interest or the target, and control logic to process the observed data. In one embodiment, the use of photonics processing extended with LC or LCOS processing can enable the integration of a LIDAR engine on a single chip, compatible with wafer-scale manufacturing technologies. The light sources and detectors (e.g., lasers and photodetectors (PDs)) can be created on the same chip, or coupled to the solid state LIDAR engine. In either case, the solid state LIDAR engine provides a LIDAR engine with no moving parts, and which can be manufactured at much lower cost than traditional LIDAR engines. Additionally, the use of semiconductor processing techniques allows the device to be low power and to have a much smaller form factor than traditionally available. Additionally, the resulting LIDAR circuit does not need the traditional precision mechanical parts, which not only increase costs, but suffer from vibration and other environmental disturbances. Furthermore, the solid state LIDAR would not require hermetic sealing on the packaging, which is traditionally necessary to avoid dust and humidity from clogging the mechanics of the LIDAR system.

Reductions in power and size combined with improvements in reliability (reduced sensitivity to environmental factors) can increase the applications of 3D imaging. 3D imaging with a solid state LIDAR as described herein can improve functionality for gaming and image recognition. Additionally, 3D imaging can be more robust for applications in replication of objects for 3D printing, indoor mapping for architecture or interior design, autonomous driving or other autonomous robotic movements, improved biometric imaging, and other applications. In one embodiment, the solid state LIDAR described herein can be combined with inertial measurement circuits or units to allow high resolution 3D imaging of a scene. Such a combined device would significantly improve on the low resolution of conventional LIDAR system. The low resolution of traditional LIDAR system is due to raster scanning a discrete series of point, which degrades spatial resolution.

It will be understood that there are different types of LIDAR, including time-of-flight (TOF) and frequency modulated continuous wave (FMCW). TOF LIDAR relies on measuring the time delay between a transmitted pulse and a received pulse, and is therefore suitable for long range applications. For shorter range applications, high speed electronics provide better imaging. In FMCW systems, the laser wavelength can be scanned in a sawtooth waveform. The reflected beam is received and interfered with the reference beam in the LIDAR system (the LIDAR engine and detectors). The beat signal gives the frequency difference between the 2 beams, which can be converted to time and thus distance of the object. Hence, we propose a tunable laser to provide superior performance.

To complete a LIDAR system, a LIDAR engine that generates steerable light is combined with one or more photodetectors to receive the reflected light. In one embodiment, a detector is integrated with the LIDAR engine circuit. In one embodiment, a laser is also integrated with the LIDAR engine circuit. The detector can be a discrete photodetector or a hybrid photodetector made in the same process as a hybrid laser, which can be made as part of the semiconductor photonics processing. The architecture of the receiver depends on the type of LIDAR (e.g., TOF or FMCW).

FIG. 1 is a block diagram of an embodiment of a system with an integrated solid state LIDAR circuit. System 100 represents any system in which a solid state LIDAR (which can also be referred to as a LIDAR engine circuit or LIDAR circuit) can be used to provide 3D imaging. Device 110 includes LIDAR 120 to perform imaging of target object 130. Target object 130 can be any object or scene (e.g., object against a background, or group of objects) to be imaged. Device 110 generate a 3D image of object 130 by sending beamformed light 132 (a light signal) and processing reflections from the light signal.

Device 110 represents any computing device, handheld electronic device, stationary device, gaming system, print system, robotic system, or other type of device that could use 3D imaging. Device 110 can have LIDAR 120 integrated into device 110 (e.g., LIDAR 120 is integrated onto a common semiconductor substrate as electronics of device 110), or mounted or disposed on or in device 110. LIDAR 120 can be a circuit and/or a standalone device. LIDAR 120 produces beamformed light 132. In one embodiment, LIDAR 120 also processes data collected from beamformed light 132.

FIG. 1 includes one embodiment of a close-up of LIDAR 120 in the rotated inset. Traditional LIDAR implementations require mechanical parts to steer generated light. LIDAR 120 can steer light without moving parts. It will be understood that the dimensions of elements illustrated in the inset are not necessarily to scale. LIDAR 120 includes substrate 122, which is a silicon substrate or other substrate in or on which photonics 124 are integrated. In one embodiment, substrate 122 is a silicon-based substrate. In one embodiment, substrate 122 is a III-V substrate. In one embodiment, substrate 122 is an insulator substrate. Photonics include at least an array of waveguides to convey light from a source (e.g., a laser, not specifically shown) to a coupler that can output the light as beamformed light 132.

Insulator 126 includes an opening (not seen in system 100) over an array of waveguides and/or other photonics 124 to selectively provide an interface between photonics 124 and LC 128. In one embodiment, insulator 126 is an oxide layer (any of a number of different oxide materials). In one embodiment, insulator 126 can be a nitride layer. In one embodiment, insulator 126 can be another dielectric material. LC 128 can change a refractive index of waveguides in photonics 124. The opening in insulator 126 introduces differences in phase in the various light paths of the array of waveguides, which will cause multiple differently-phased light signals to be generated from a single light source. In one embodiment, the opening in insulator 126 is shaped to introduce a phase ramp across the various waveguides in the array of waveguides in photonics 124. For example, an opening directly over the waveguides where there is a different amount of each waveguide exposed to LC 128, which can change the amount the LC will affect the phase of each waveguide path.

It will be understood that the shape in insulator 126 can change how much of each waveguide path is exposed to LC 128. Thus, application of a single voltage level to LC 128 can result in different phase effects at all the waveguide paths. Such an approach is contrasted to traditional methods of having different logic elements for each different waveguides to cause phase changes across the waveguide array. Differences in the single voltage applied to LC 128 (e.g., apply one voltage level for a period of time, and then apply a different voltage level) can dynamically change and steer the light emitted from LIDAR 120. Thus, LIDAR 120 can steer the light emitted by changing the application of a voltage to the LCOS, which can in turn change the phase effects that occur on each waveguide path. Thus, LIDAR 120 can steer the light beam without the use of mechanical parts. Beamformed light 132 passes through insulator 126, LC 128, and a capping layer such as glass 129. The glass layer is an example only, and may be replaceable by a plastic material or other material that is optically transparent at the wavelength(s) of interest. The ramped arrows representing beamformed light 132 in the inset are meant to illustrate that the phases of the light can be changed to achieve a beam forming or steering effect on the light without having to mechanically direct the light.

Figure 2:
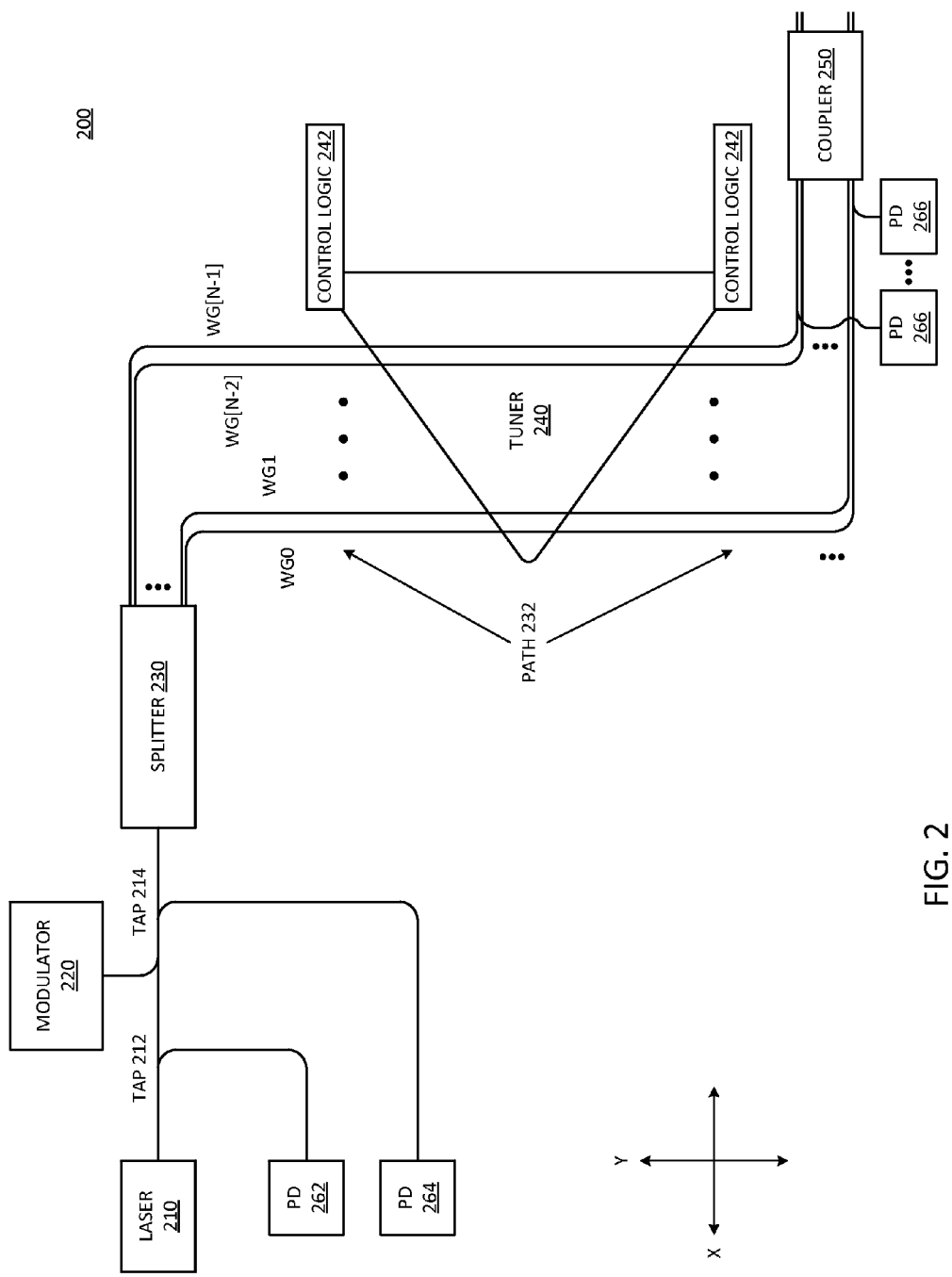
FIG. 2 is a block diagram of an embodiment of a top view of an integrated solid state LIDAR circuit.

FIG. 2 is a block diagram of an embodiment of a top view of an integrated solid state LIDAR circuit. System 200 represents elements including a solid state LIDAR circuit, which can be one example of a LIDAR 120 in FIG. 1. In one embodiment, system 200 includes elements that are not necessarily part of every implementation of a LIDAR circuit. System 200 includes laser 210, which could be separate from the LIDAR circuit.

Laser 210 is a light source for system 200. In one embodiment, laser 210 can be integrated on the same circuit as the LIDAR. Laser 210 could be integrated directly on the same substrate that includes the photonic components. Such an implementation can provide a self-contained steerable laser. Laser 210 could also be combined in a multichip package or system on a chip arrangement where laser 210 is a separate die combined in package and/or on the same substrate as the photonics. Laser 210 could also be included as a separate chip (off chip) from the LIDAR photonics.

In one embodiment, system 200 includes modulator 220. If laser 210 is a chirped laser design, modulator 220 is not necessary. A chirped laser can provide modulation directly into the light generated. For example, a frequency modulated continuous wave (FMCW) laser is chirped, and does not require external modulation of the light signal. In one embodiment, modulator 220 can provide amplitude modulation to the laser signal. The amplitude modulation can be added, for example, to a pulsed laser. In one embodiment, system 200 pulses the laser signal to the far field (to the target) and a detector times the echo. Other ranging implementations are possible. In one embodiment, modulator 220 is a ring modulator that can pulse the output for time-of-flight (TOF) operation or to be encoded in either time-of-flight or FMCW mode to avoid interference from other optical sources in the vicinity.

System 200 includes splitter 230, which is a mechanism that splits the source light from laser 210 into N channels, such as 8 or 16. The N channels are illustrated by waveguides 0 through [N−1] (WG[0] through WG[N−1]). The N channels or waveguides is the array of waveguides referred to herein. N can be any number of channels that will provide proper resolution for the LIDAR, and will typically be a binary number. It will be understood that there are many different ways to split an optical signal. Splitter 230 can therefore vary from one implementation to another. In one embodiment, splitter 230 is or includes a multimode interference (MMI) coupler. In one embodiment, splitter 230 is or includes a star coupler.

From splitter 230, the light signal is carried through the array of waveguides along path 232, which is a path from splitter 230 to coupler 250. Coupler 250 allows system 200 to emit the light from the various channels. In one embodiment, path 232 includes right angle bends to route the waveguides to coupler 250. The right angle bends allow the introduction of spacing between the waveguides of the array. The spacing can allow the introduction of phase offsets between the waveguides relative to each other. The phase offsets or phase shifting provides phase differences in the laser signal that enables beam forming and beam steering in the emitted wavefront. In one embodiment, it can be possible to introduce spacing differences in splitter 230, or in some other way in system 200; thus, the right angle bends in the array of waveguides may not be needed in one embodiment.

Path 232 passes the array of waveguides through tuner 240. Tuner 240 represents a mechanism in system 200 that introduces relative phase offsets in the various waveguides of the array. In embodiment, tuner 240 includes an opening in an oxide layer (or other insulator layer or insulating layer, where oxide is used as a non-limiting example) that is adjacent the photonics components of the LIDAR. The opening in the oxide exposes the waveguide channels to the liquid crystal of an LCOS layer (or other LC layer, where LCOS is used as a non-limiting example) adjacent the oxide layer. In one embodiment, the opening can be triangular to expose the channels to more and more of the liquid crystal to create a linear phase shift across the channels. For example, assuming the triangular shape of tuner 240 to be the shape of the opening in the oxide, WG[0] is exposed to less of the liquid crystal than WG[1], because WG[0] is closer to the apex of the triangle than WG[1]. There is also less of WG[1] exposed to less of the liquid crystal than there would be for WG[2] (not explicitly shown), and so forth from one adjacent waveguide to another until WG[N−1], which is the most exposed to the liquid crystal. WG[N−1] is shown as being located nearest the base of the illustrated triangle. There would be a linear phase shift from WG[0] to WG[N−1] based on the voltage applied to the liquid crystal. Thus, the liquid crystal can act as a single tuner for all channels which steers the emitted beam from side to side.

It will be understood that instead of using an opening in the oxide and a voltage applied to a liquid crystal layer, system 200 could include control logic to introduce a delay signal to each waveguide individually. Such a tuning mechanism would require more power and would require significantly more logic than the LCOS tuning mechanism. It will be understood that the opening in the oxide layer does not have to match what is shown, but can be a right triangle, or could be a trapezoid or other shape. There could also be a configuration where the phase shifts are not linear from one side of the waveguide array to another, but different shapes of opening could be used to introduce other delay into the waveguide. For example, an opening could be formed to expose a waveguide in the middle of the array to the least amount of liquid crystal, and be of a complex shape that in some other way introduces different delays to the different waveguides. While the principles discussed would be the same for such configurations, the illustration of system 200 offers a simpler solution than such complex oxide opening patterning.

Control logic 242 represents logic in system 200 that can control the beam forming of light from the waveguides of the array. In one embodiment, system 200 includes control logic that interacts with an LCOS layer to introduce phase shifting the in the waveguides. In one embodiment, system 200 includes control logic to interact with the waveguides to introduce the phase shifting. In one embodiment, system 200 includes control logic to interact with coupler 250 to control the emission of light from system 200. In one embodiment, system 200 includes control logic to align the signals in the various waveguides prior to introducing the desired phase offsets. For example, splitter 230 and/or path 232 could introduce different delays into the waveguide signals, relative to one another. Such delays would normally be considered within the operating tolerances of a photonics circuit. However, to carefully control the phase delay for purpose of controlling the beam forming of the signals, system 200 can compensate and/or account for other delays or phase shifts introduced into the waveguides. Thus, tuning can start with all channels having uniform phase, to more precisely introduce the desired phase delays. Alternatively, the shaping or operation of tuner 240 can compensate for expected phase delays introduced by the architecture of the photonics in system 200.

In one embodiment, system 200 can provide both X and Y beam steering, relative to the axes shown in system 200. A phased array as described, where phase shifting is introduced into different waveguides of the array, can provide x-axis beam steering. In one embodiment, system 200 includes one or more mechanisms to introduce a variable refractive index on the output of light from coupler 250, which can introduce y-axis beam steering.

The light or laser signal is output from system 200 by coupler 250. The direction of propagation of the signal from coupler 250 would typically be directly out of the page at the reader from the configuration illustrated in system 200. The light signal is sent to the target to cause far field interference. Light will be reflected back toward system 200 as scattered light after interfering with the far field. It will be understood that a complete LIDAR system will include one or more detectors (e.g., photodetectors) to receive the reflected light that interfered in the far field. The receptors or detectors then send signals to a processor or control logic to interpret the signals. In one embodiment, system 200 includes detectors on chip with the other LIDAR photonics components. Such detectors are not explicitly shown. The detectors could alternatively be off-chip.

In one embodiment, system 200 includes one or more local detectors 262, 264, and 266 to provide reference signals that can be used by the processing hardware to process or interpret the received signals. Detectors 262, 264, and 266 can be referred to as monitor detectors, which provide reference information to the processing hardware. In one embodiment, one or more of detectors 262, 264, and/or 266 are integrated on the same semiconductor substrate at the waveguides. In one embodiment, system 200 includes photodetector (PD) 262 which taps off the laser source at tap 212 to provide a reference to the original signal generated. PD 262 could be on the same chip as laser 210, but is not necessarily located on the same substrate as laser 210. In one embodiment, system 200 includes PD 264 which taps off at tap 214 after modulator 220. It will be understood that depending on what type of laser 210 is used, modulator 220 may be unnecessary, which could make tap 212 and tap 214 equivalents. In an embodiment there tap 214 is optically different from tap 212, PD 264 can provide a reference signal to indicate the modulated signal received at splitter 230. PD 264 can provide its information to the processing hardware. In one embodiment, system 200 includes one or more PDs 266, which can tap off the phase shifted signals to be sent out coupler 250. In one embodiment, there can be N PDs 266, one for each waveguide. In another embodiment, there can be fewer than N PDs, and the processing hardware can interpolate information from the reference signals that are provided.

Figure 3:
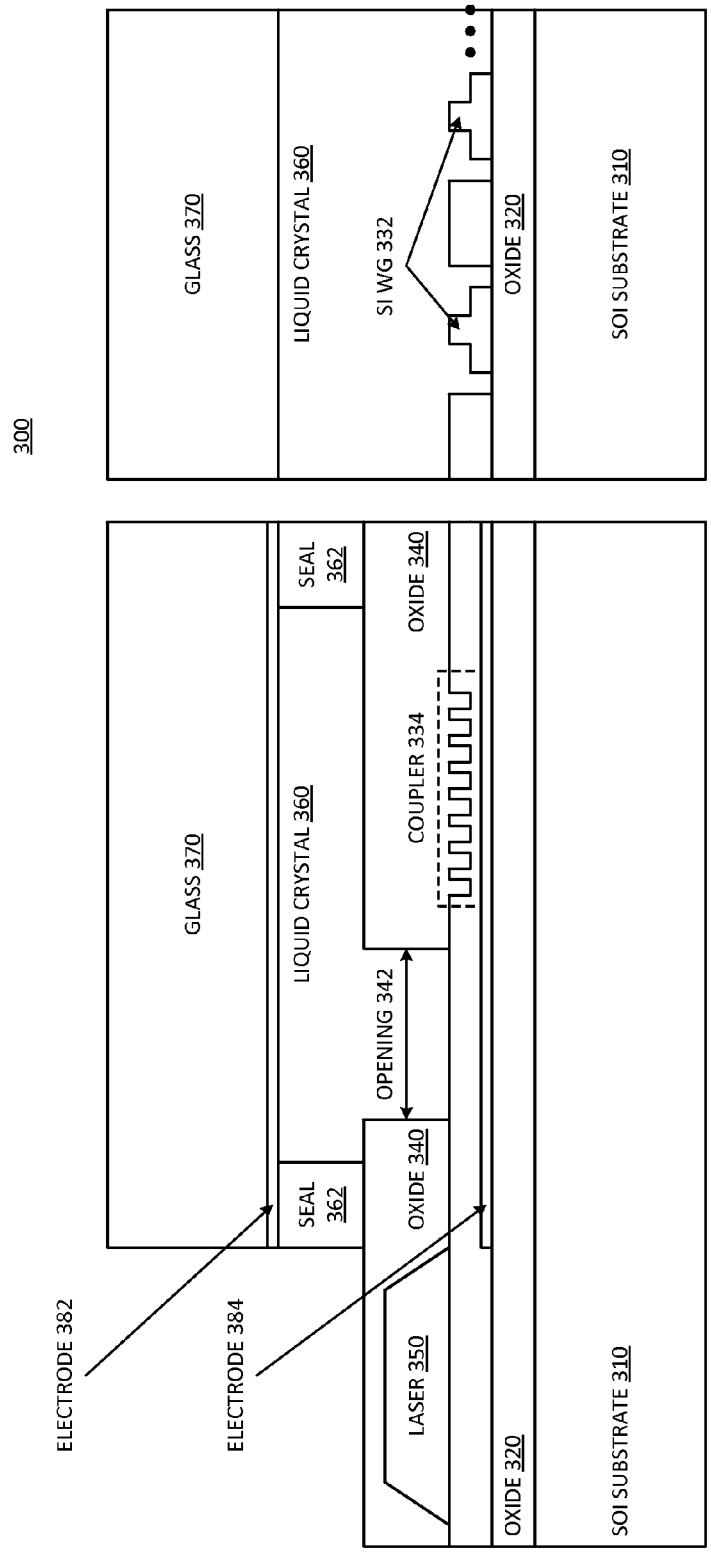
FIGS. 3A-3B are block diagrams of an embodiment of cross sections of an integrated solid state LIDAR circuit.

FIGS. 3A-3B are block diagrams of an embodiment of cross sections of an integrated solid state LIDAR circuit. Circuit 300 represents elements of a solid state LIDAR engine chip, and can be an example of a solid state LIDAR in accordance with any embodiment described herein. In one embodiment, circuit 300 is based on silicon photonics circuits as illustrated, but in another embodiment, other semiconductor architectures can be used to create a solid state LIDAR chip. FIG. 3A illustrates an embodiment of a cross section of the LIDAR engine photonics. FIG. 3B illustrates an embodiment of a cross section of a portion of a silicon waveguide array.

Circuit 300 includes SOI (silicon on insulator) substrate 310, which can be used as a substrate on which to process silicon photonics. Oxide layer 320 can represent the insulator of substrate 310. Silicon waveguide 332 can be processed into substrate 310 to couple light from laser 350 to coupler 334. In one embodiment, laser 350 is integrated directly on substrate 310 (and can include a modulator). In one embodiment, what is illustrated as laser 350 represents an area where laser light is coupled into circuit 300 from an off-chip laser. Silicon waveguide 332 represents the waveguide array, as mentioned herein, and as shown more specifically in FIG. 3B.

Oxide 340 represents an oxide layer or cladding oxide adjacent the photonics components, and covers the silicon photonics of circuit 300. Oxide 342 includes opening 342, which exposes waveguide 332 to liquid crystal 360. In the cross section of FIG. 3B, oxide 340 is not shown, because the cross section is provided for an area of circuit 300 where waveguides 332 are not covered by oxide 340, but are exposed to liquid crystal 360. In one embodiment, liquid crystal 360 is an area surrounded by seal 362 that is processed on substrate 310. In one embodiment, such processing is part of a different processing routine than what is used to create the silicon or other semiconductor photonics components. The different processing routine is not necessarily even carried out on the same processing line or processing facility. Glass 370 is a cap layer for circuit 300, and represents a material that is optically transparent at the wavelength(s) of interest, referring to the wavelength(s) of light emitted via coupler 334.

Coupler 334 represents a coupling mechanism that changes the direction of the light signal, to emit the signal that travels through waveguide 332 to pass out through glass 370 to the imaging target. In one embodiment, coupler 334 is a grating coupler. In one embodiment (as illustrated and described in more detail with respect to FIG. 4), coupler 334 is a mirror-based coupler. In one embodiment, coupler 334 represents an array of couplers, just as waveguide 332 represents a waveguide array. There can be a coupler for each waveguide, or another configuration that will allow the phase delayed signals to emit out of circuit 300. It will be understood that gratings are wavelength dependent. But by wavelength tuning the laser, system 300 can steer the beam even with a wavelength dependent grating.

It will be understood that liquid crystal 360 needs two electrodes to create a voltage that causes the phase shifting in waveguide array 332. In one embodiment, electrode 382 is located between liquid crystal layer 360 and glass layer 370. In one embodiment, electrode 384 is located between waveguide 332 and oxide 320. Applying a voltage between electrodes 382 and 384 can change an index of refraction of interface between liquid crystal 360 and waveguide 332. In one embodiment, electrode 382 is an indium tin oxide (ITO) material. In one embodiment, electrode 384 is a material deposited on oxide 320. In another embodiment, system 300 biases liquid crystal 360 directly to the waveguide, in which case electrode 384 can represent doping of waveguide 332. By adjusting the electric field on liquid crystal 360 next to waveguide 332, system 300 can change the phase delay, which will steer/form the wave front of the emitted beam. The electric field near waveguide 332 can be changed by applying a voltage between silicon features within the wafer (electrode 384) and/or a voltage on the electrode on the glass wafer (electrode 382). The phase change can occur via thermal phase control or based on a free carrier effect.

Similar to what is described with respect to system 200, circuit 300 can generate 3D data from a scene without the use of mechanical beam steering or broadcast illumination. Liquid crystal 360 interfaces directly with waveguides 332 via opening 342 in oxide 340. Liquid crystal 360 creates a phased array of signals from the light signals split into an array of waveguides 332. Overlaid liquid crystal 360 can tune the refractive index of each beam component as provided in the separate waveguides 332 by application of a voltage. The waveguides transfer the phased array of signals to coupler(s) 334, which can also be referred to as emitters, to transmit the signals out of system 300. Thus, the light signal can be a steered beam emitted from the circuit or chip and monitoring hardware (e.g., photodetectors and processing hardware) can monitor a far field beam shape formed by the relative phases introduced into the individual components of the optical signal.

Circuit 300 can provide several advantages over traditional LIDAR systems. In one embodiment, circuit 300 can provide a single-chip solution, fully integrated with lasers and detectors and batch fabricated using existing fabrication processes. Such a single-chip solution can provide substantial cost savings in space as well as the cost of manufacture. The primary cost of traditional LIDAR systems arises from the complex and precise assembly of many optical and mechanical elements, which can be eliminated with an embodiment of system 300. In one embodiment, a LIDAR system in accordance with system 300 does not include any moving parts, but can perform all beam steering electrically via application of voltages to electrodes 382 and 384 (and thus to liquid crystal 360). System 300 is also inherently lower power as compared to traditional LIDAR system, given that the steering mechanism does not involve any motorization, but rather voltage applied across a solid-state capacitor to vary the field in the liquid crystal. As discussed above, varying the field in the liquid crystal can phase-adjust the components of the beam as transferred in each separate waveguide 332. In one embodiment, system 300 can reduce sensitivity of the LIDAR to ambient light or other nearby LIDAR systems by encoding the beam with an on-chip modulator (not specifically shown in 300, but can be included in accordance with an embodiment described herein).

Figure 4:
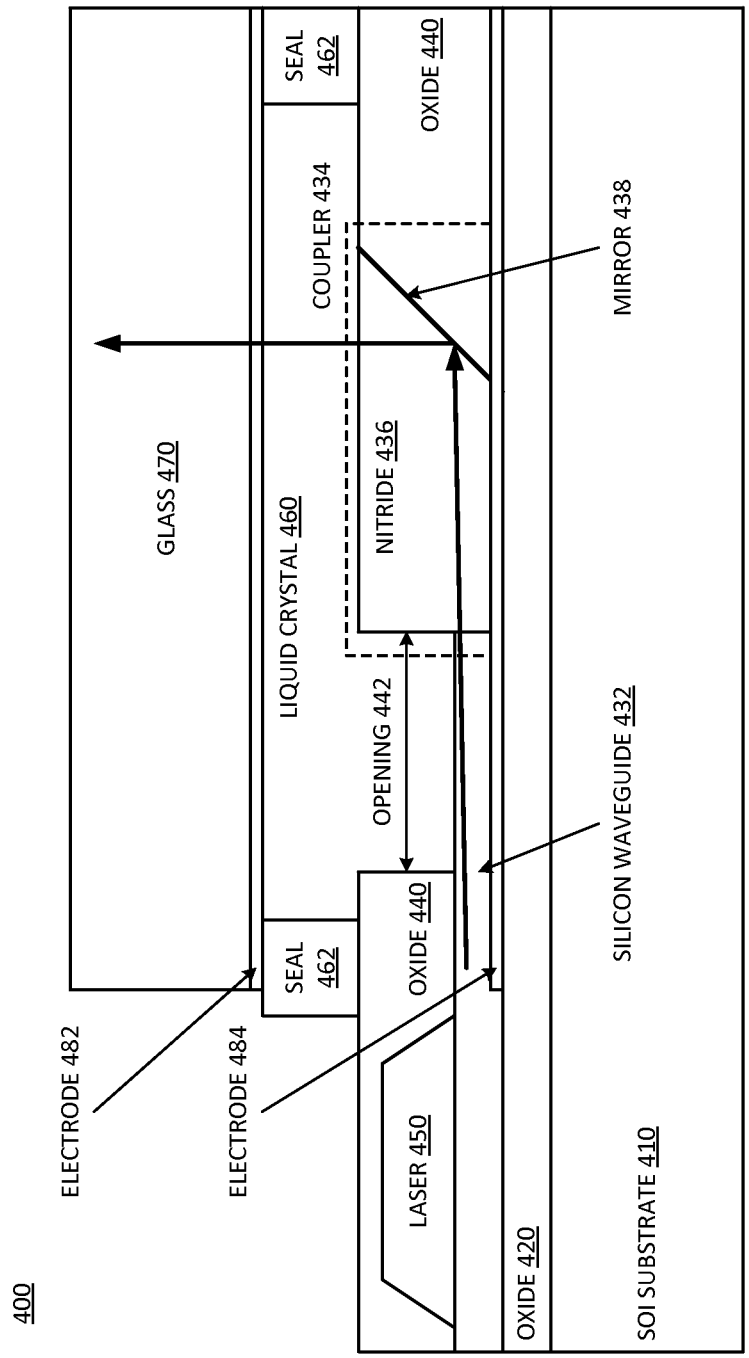
FIG. 4 is a block diagram of an embodiment of a LIDAR circuit with a mirror coupler.

FIG. 4 is a block diagram of an embodiment of a LIDAR circuit with a mirror coupler. Circuit 400 represents elements of a solid state LIDAR engine chip, and can be an example of a solid state LIDAR in accordance with any embodiment described herein. Circuit 400 includes mirror 438 in coupler 434, which is an alternative to a grating coupler. Otherwise, one embodiment of circuit 400 is the same as circuit 300. Circuit 400 includes SOI substrate 410 and oxide layer 420, which can provide a substrate for silicon photonics, similar to what is described above with respect to circuit 300. Circuit 400 also includes silicon waveguide 432 processed into substrate 410 to couple light from laser 450 to coupler 434. The descriptions above of similar components in circuit 300 apply equally to the components of circuit 400.

Additionally, oxide 440 represents a cladding oxide layer with opening 442 to expose waveguide 432 to liquid crystal 460. In one embodiment, liquid crystal 460 is an area surrounded by seal 462 that is processed on substrate 410. In one embodiment, circuit 400 includes electrodes 482 and 484 to apply a field to liquid crystal 460, similar to what is described above with respect to circuit 300. The descriptions above of similar components in circuit 300 apply equally to the components of circuit 400. In one embodiment, opening 442 is an opening in oxide 440 that can also interface a portion of nitride 436. It will be understood that nitride 436 is processed into oxide 440 for mirror 438, and thus opening 432 can be considered to be an opening in the oxide, even though there is also nitride present.

Glass 470 is a cap layer for circuit 400, and represents a material that is optically transparent at the wavelength(s) of interest, referring to the wavelength(s) of light emitted via coupler 434. Coupler 434 represents a coupling mechanism that changes the direction of the light signal, to emit the signal that travels through waveguide 432 to pass out through glass 470 to the imaging target. Coupler 434, like coupler 334 discussed above, performs redirection of the light from the laser from in-plane to out-of-plane. Coupler 434 is mirror-based coupler. In one embodiment, coupler 434 represents an array of couplers to interface with waveguide array 432. However, with mirror 438, a single mirror can perform signal redirection for an entire array of waveguides. Mirror 438 is a surface processed onto oxide 440 to produce an angle of refraction that will cause total internal reflection (TIR) of light from waveguide 432. In one embodiment, mirror 438 is simply the interface surface between nitride 436 and oxide 440. In one embodiment, mirror 438 includes a metal or metallic substance to produce the TIR. In one embodiment, mirror 438 is frequency independent, unlike a grating-based coupler. Thus, circuit 400 can reflect light orthogonal to the source chip with the same performance for any tunable frequency of laser that might be used by laser 450. Thus, circuit 450 could offer better performance for a FMCW LIDAR system than a comparable circuit with a grating-based coupler.

FIG. 5A is a block diagram of an embodiment of a cross section of a LIDAR circuit with an angled facet. Circuit 502 represents a LIDAR circuit in accordance with any embodiment described herein. In one embodiment, SOI substrate 510, oxide 520, waveguide 532, oxide 540, liquid crystal 560, glass 570, electrode 582, and electrode 584 are similar to common components of any embodiment described above with respect to circuit 300. In addition to what is described above, circuit 502 illustrates seal 562 extended between glass 570 and electrode 582. Specifically, the seal layer is illustrated as shaded for easier visibility in the diagram. Similar to glass 570, seal 562 can be optically transparent to the wavelength(s) of interest that will be emitted from circuit 502.

In one embodiment, coupler 534 is a grating coupler, as shown. Coupler 534 could alternatively be a mirror-based coupler such as that illustrated and described above with respect to circuit 400. In one embodiment, circuit 502 includes one or more prisms 552 in oxide 540. In such an embodiment, oxide layer 540 can be referred to as blazed cladding. Prisms 552 spread the source light in a plane orthogonal to the plane of waveguide 532, such as what is illustrated. In one embodiment, prisms 552 enable circuit 502 to perform beam steering in an x-axis (as illustrated in circuit 200). Prisms 552 can also be referred to as angled facets, which are located over coupler 534, or located relative to the coupler to spread light emitted by coupler 534.

FIG. 5B is a block diagram of another embodiment of a cross section of a LIDAR circuit with an angled facet. Whereas circuit 502 illustrates prisms or angled facets in the oxide layer, circuit 504 illustrates prisms or angled facets in the liquid crystal layer. In one embodiment, SOI substrate 510, oxide 520, waveguide 532, oxide 540, liquid crystal 560, glass 570, electrode 582, and electrode 584 are similar to common components of any embodiment described above with respect to circuit 300. Similar to circuit 502, circuit 504 also illustrates seal 562 extended between glass 570 and electrode 582.

In one embodiment, coupler 534 is a grating coupler, as shown. Coupler 534 could alternatively be a mirror-based coupler such as that illustrated and described above with respect to circuit 400. In one embodiment, circuit 504 includes one or more prisms 554 in liquid crystal 560. In such an embodiment, prisms 554 in liquid crystal layer 560 can be formed by using structured glass for glass layer 570 in LCOS processing. Similar to prisms 552, prisms 554 can spread the source light in a plane orthogonal to the plane of waveguide 532, such as what is illustrated. Prisms 554 can be referred to as angled facets, which are located over coupler 534, or located relative to the coupler to spread light emitted by coupler 534. In one embodiment, prisms 552 of circuit 502 could be combined with prisms 554 of circuit 504. Thus, a LIDAR circuit can be configured with any combination of grating coupler or mirror coupler and angled facets on an oxide layer, a liquid crystal layer, or both.

Figure 6:
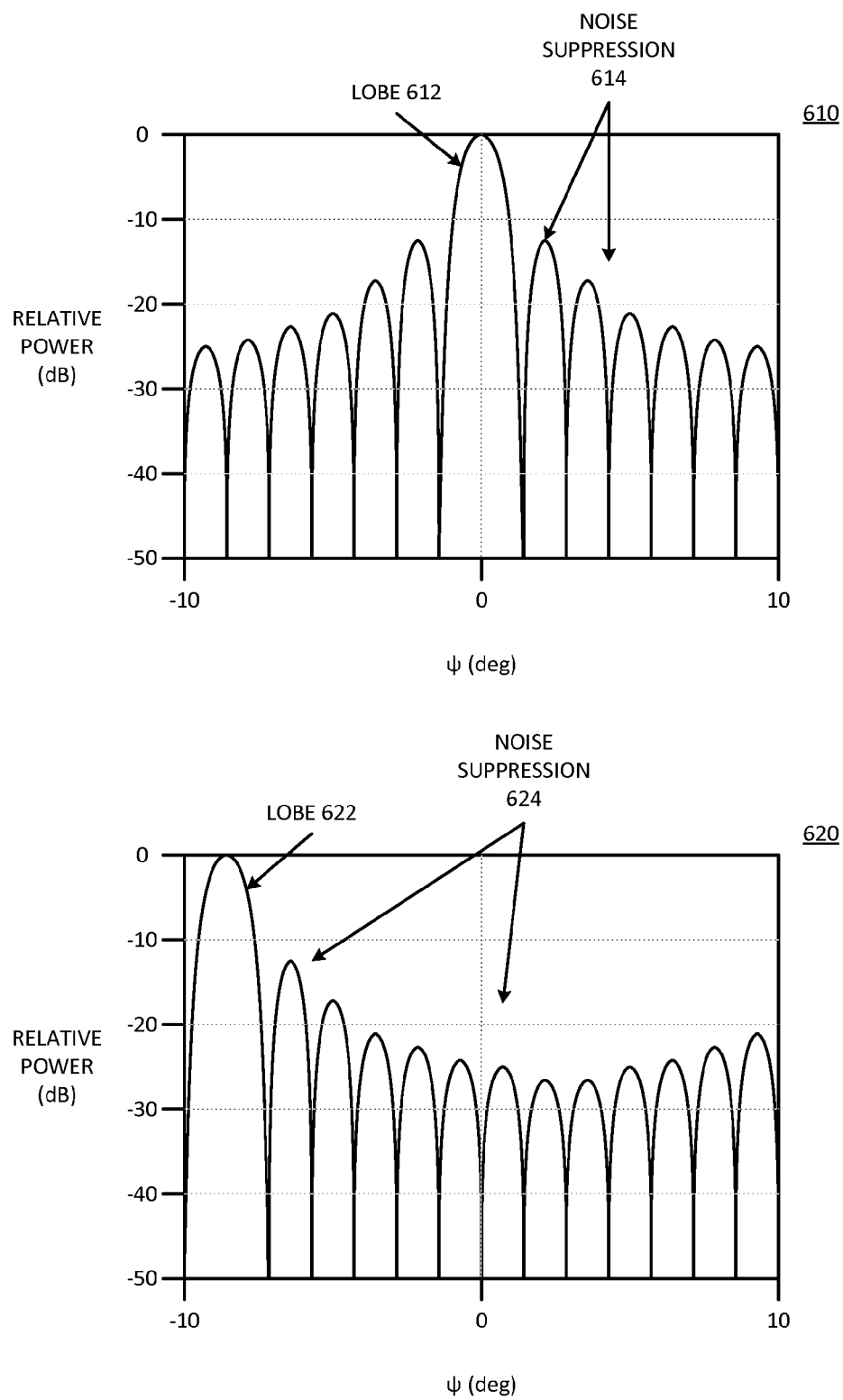
FIG. 6 is a representation of an embodiment of a signal beam formed with a solid state LIDAR circuit.

FIG. 6 is a representation of an embodiment of a signal beam formed with a solid state LIDAR circuit. Diagrams 610 and 620 illustrate example far field light beam profiles for a light beam signal emitted from a solid state LIDAR in accordance with an embodiment described herein. Diagram 610 can illustrate the light beam when all channels of a waveguide array are in phase. Diagram 620 can illustrate the light beam when a linear phase ramp is applied to the channels of the waveguide array. The vertical axis represents relative power as measured in dB, relative to the main lobe (lobe 612 for diagram 610, and lobe 622 for diagram 620). The horizontal axis represents an axis perpendicular to the array as measured in degrees (shown by psi ($\psi$)).

In diagram 610, lobe 612 is at approximately zero degrees. It will be observed that there is approximately 14 dB of noise suppression 614 or more for other lobes. In diagram 620, lobe 622 is shifted to approximately $-9$ degrees. More specifically, diagram 620 represents one embodiment of a phase ramp of 0.8 $\pi$/channel (positive 0.8 pi radians per channel). A phase ramp of $-0.8$ $\pi$/channel (negative 0.8 pi radians per channel) would be a mirror image of diagram 620, with lobe 622 shifted to approximately +9 degrees. It will be observed that noise suppression is maintained, as illustrated by noise suppression 624. Thus, a solid state LIDAR circuit can achieve approximately 18 degrees of steering, with 14 dB or higher of noise suppression.

It will be understood that the shifting of the primary lobe can be accomplished by applying a voltage between a glass layer and the semiconductor substrate in which the waveguide array is processed. Thus, a voltage is generated across a liquid crystal layer including on a portion adjacent to the waveguide array (through an opening in the cladding). In one embodiment, one or more prisms exist at an interface of the liquid crystal with the cladding oxide, or at an interface of the liquid crystal with the glass layer, or both. The LIDAR engine circuit can tune the refractive index of the prism(s), and steer the light emitted to the target.

It will be understood that the spatial resolution of the LIDAR engine circuit will depend on the design of the system. For example, diagrams 610 and 620 might apply to a LIDAR system with approximately 16 channels (N=16 in system 200). For an embodiment where N is greater than 16, higher resolution is achievable. Additionally, depth resolution can vary from single digit millimeter resolution to tens of microns of resolution depending on the type of laser used.

In one embodiment, a LIDAR engine circuit in accordance with an embodiment described herein requires only three analog electrical inputs: one to create the phase shifting for a phased array, one for prism tuning, and one for ground. In contrast, traditional LIDAR systems require many more analog inputs. For example, J. K. Doylend et al, Hybrid III/V silicon photonic source with integrated 1D free-space beam steering, *Optics Letters* 37 (20), p. 4257-9 (2012) has shown a 1D array that requires N+1 inputs (meaning at least one more input than the number of channels). As another example, J. Sun et al, Large-scale nanophotonic phased array, *Nature* 493, p. 195-9 (2013) has shown a 2D array that requires $N^2$ inputs. Thus, embodiments of the LIDAR engine circuit can provide significant simplification of system-level complexity.

Figure 7:
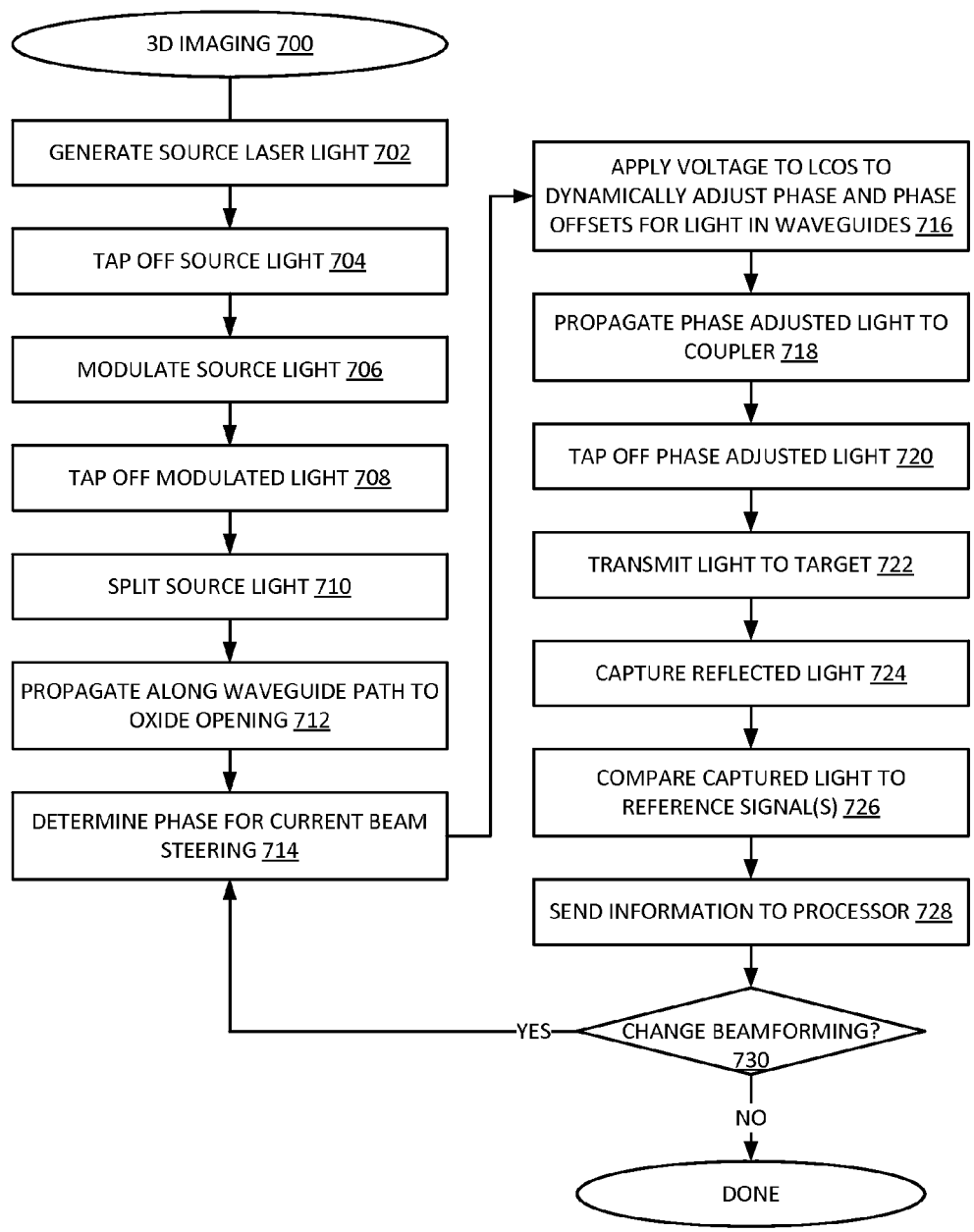
FIG. 7 is a flow diagram of an embodiment of a process for imaging with a solid state LIDAR circuit.

FIG. 7 is a flow diagram of an embodiment of a process for imaging with a solid state LIDAR circuit. An embodiment of process 700 for 3D imaging can be executed by a solid state LIDAR engine in accordance with any embodiment described herein. A LIDAR system generates a source laser light signal, 702. In one embodiment, the laser is a laser integrated on the same LIDAR engine circuit that includes a waveguide array and beam steering mechanisms. In one embodiment, the laser is off-chip from the LIDAR engine.

In one embodiment, the system taps off the laser source signal for use as a reference signal, 704. In one embodiment, the LIDAR system includes a modulator to modulate the source light, 706. In one embodiment, the laser is a modulated laser that can modulate the source light. In one embodiment, the system taps off the modulated source light signal for use as a reference signal, 708.

The LIDAR system includes a splitter to split the source light into multiple channels, 710. The system propagates the light of the multiple channels along a waveguide path for each waveguide of a waveguide array. The waveguide path passes the waveguides to a beam steering mechanism. In one embodiment, the waveguide path passes to an opening in the oxide, 712, which can expose the waveguides to a liquid crystal layer that can introduce phase variance in the different channels of the waveguide array. In one embodiment, the system can include control logic that introduces phase delays in the waveguides of the waveguide array to steer the beam.

In one embodiment, the system determines what phase to apply to beam steer the current emission of light for the 3D imaging, 714. The system can apply a voltage across the liquid crystal layer to dynamically adjust the phase and phase offsets of the light in the different waveguides of the waveguide array, 716. The phase offsets form the beam emitted from the LIDAR circuit. Application of different voltages in sequence to the liquid crystal can dynamically adjust the phase offsets and steer the beam. In one embodiment, the system applies a phase adjustment to all waveguides in the array. In one embodiment, all waveguides but one are adjusted. The system propagates the phase adjusted light to a coupler via the waveguide array, 718. In one embodiment, the system taps off phase adjusted light near the coupler, 720. The tapped off light can be a reference signal to process reflected light.

The LIDAR circuit transmits the light to the target or imaging field, 722, and captures reflected light with one or more detectors, 724. The detectors can be on the same chip as the LIDAR engine, or a different chip. The system processes the captured light signals, for example, by comparing the captured light against one or more reference signals, 726. The reference signals can be signal provided by tapping off the light signal between the source laser and the coupler. The system can send the information to a processor or processing logic that performs the signal processing and generates the 3D image, 728.

In one embodiment, the system steers the beam through various different phase adjustments in the waveguide array. Thus, the system can determine whether to change the beam forming or change the offsets within the waveguide array to produce different imaging information, 730. If the system has performed all imaging needed, 730 NO branch, the system ends the 3D imaging process. If the system has not performed all imaging needed, 730 YES branch, the system will against determine what phase offsets to use for the current beam steering, 714.

Figure 8:
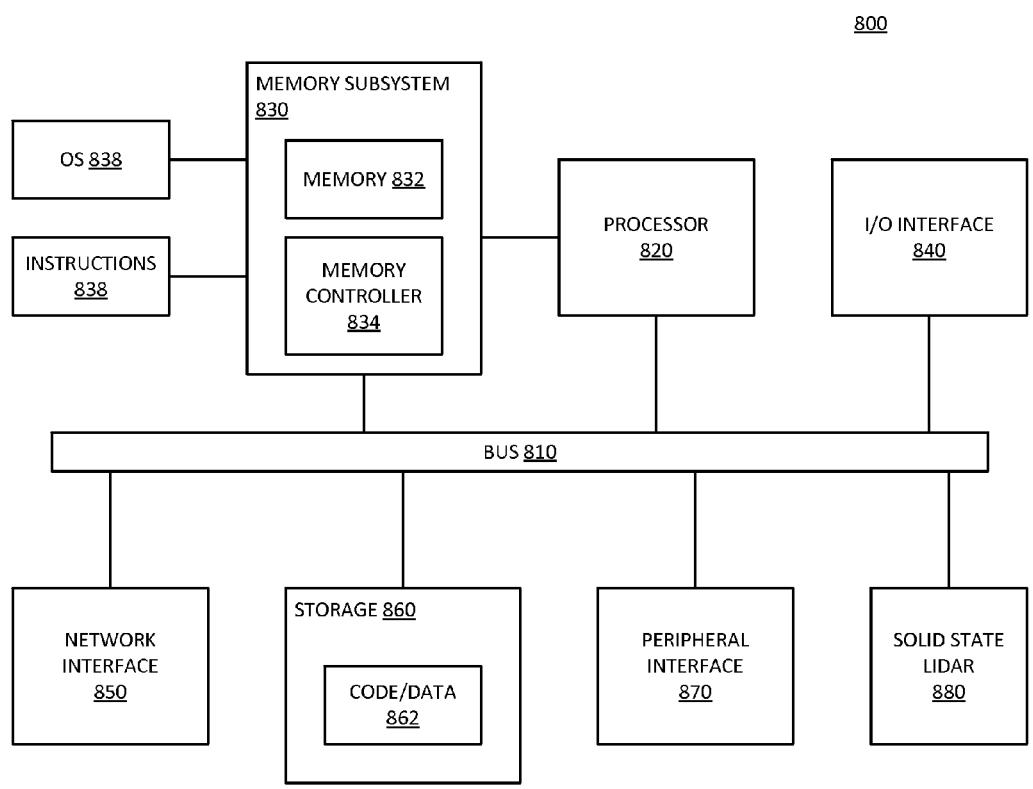
FIG. 8 is a block diagram of an embodiment of a computing system in which a solid state LIDAR circuit can be implemented.

FIG. 8 is a block diagram of an embodiment of a computing system in which a solid state LIDAR circuit can be implemented. System 800 represents a computing device in accordance with any embodiment described herein, and can be a laptop computer, a desktop computer, a server, a gaming or entertainment control system, a scanner, copier, printer, routing or switching device, or other electronic device. System 800 includes processor 820, which provides processing, operation management, and execution of instructions for system 800. Processor 820 can include any type of microprocessor, central processing unit (CPU), processing core, or other processing hardware to provide processing for system 800. Processor 820 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 830 represents the main memory of system 800, and provides temporary storage for code to be executed by processor 820, or data values to be used in executing a routine. Memory subsystem 830 can include one or more memory devices such as read-only memory (ROM), flash memory, one or more varieties of random access memory (RAM), or other memory devices, or a combination of such devices. Memory subsystem 830 stores and hosts, among other things, operating system (OS) 836 to provide a software platform for execution of instructions in system 800. Additionally, other instructions 838 are stored and executed from memory subsystem 830 to provide the logic and the processing of system 800. OS 836 and instructions 838 are executed by processor 820. Memory subsystem 830 includes memory device 832 where it stores data, instructions, programs, or other items. In one embodiment, memory subsystem includes memory controller 834, which is a memory controller to generate and issue commands to memory device 832. It will be understood that memory controller 834 could be a physical part of processor 820.

Processor 820 and memory subsystem 830 are coupled to bus/bus system 810. Bus 810 is an abstraction that represents any one or more separate physical buses, communication lines/interfaces, and/or point-to-point connections, connected by appropriate bridges, adapters, and/or controllers. Therefore, bus 810 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 810 can also correspond to interfaces in network interface 850.

System 800 also includes one or more input/output (I/O) interface(s) 840, network interface 850, one or more internal mass storage device(s) 860, and peripheral interface 870 coupled to bus 810. I/O interface 840 can include one or more interface components through which a user interacts with system 800 (e.g., video, audio, and/or alphanumeric interfacing). Network interface 850 provides system 800 the ability to communicate with remote devices (e.g., servers, other computing devices) over one or more networks. Network interface 850 can include an Ethernet adapter, wireless interconnection components, USB (universal serial bus), or other wired or wireless standards-based or proprietary interfaces.

Storage 860 can be or include any conventional medium for storing large amounts of data in a nonvolatile manner, such as one or more magnetic, solid state, or optical based disks, or a combination. Storage 860 holds code or instructions and data 862 in a persistent state (i.e., the value is retained despite interruption of power to system 800). Storage 860 can be generically considered to be a "memory," although memory 830 is the executing or operating memory to provide instructions to processor 820. Whereas storage 860 is nonvolatile, memory 830 can include volatile memory (i.e., the value or state of the data is indeterminate if power is interrupted to system 800).

Peripheral interface 870 can include any hardware interface not specifically mentioned above. Peripherals refer generally to devices that connect dependently to system 800. A dependent connection is one where system 800 provides the software and/or hardware platform on which operation executes, and with which a user interacts.

In one embodiment, system 800 includes solid state LIDAR 880. In one embodiment, LIDAR 880 is a system that includes one or more chips, which allows the LIDAR to perform non-mechanical beam forming/steering of a light signal to perform 3D imaging. In one embodiment, LIDAR 880 can be a single chip that is packaged together with other components of system 800. In one embodiment, LIDAR 880 sends imaging information (which can include reference signals) to processor 820 for processing. LIDAR 880 can include a LIDAR engine circuit in accordance with any embodiment described herein, and enables system 800 for a variety of different imaging applications.

Figure 9:
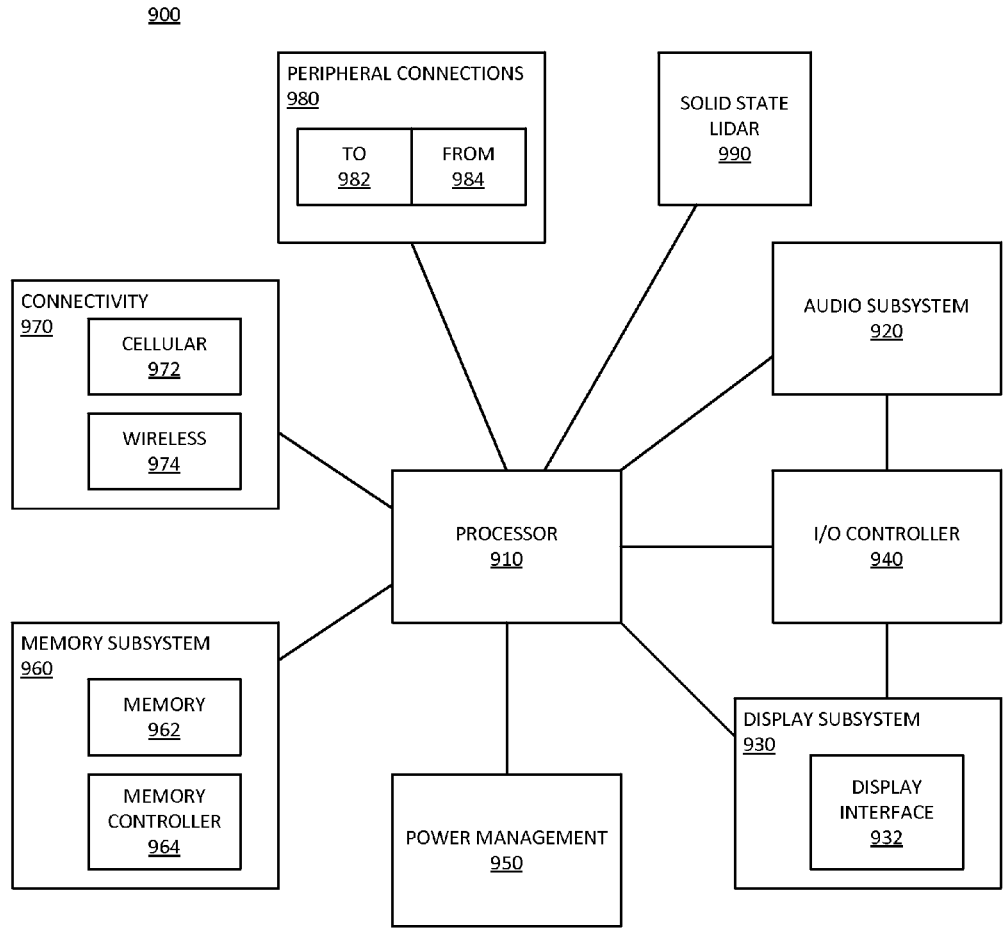
FIG. 9 is a block diagram of an embodiment of a mobile device in which a solid state LIDAR circuit can be implemented.

FIG. 9 is a block diagram of an embodiment of a mobile device in which a solid state LIDAR circuit can be implemented. Device 900 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 900.

Device 900 includes processor 910, which performs the primary processing operations of device 900. Processor 910 can include one or more physical devices, such as microprocessors, application processors, microcontrollers, programmable logic devices, or other processing means. The processing operations performed by processor 910 include the execution of an operating platform or operating system on which applications and/or device functions are executed. The processing operations include operations related to I/O (input/output) with a human user or with other devices, operations related to power management, and/or operations related to connecting device 900 to another device. The processing operations can also include operations related to audio I/O and/or display I/O.

In one embodiment, device 900 includes audio subsystem 920, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 900, or connected to device 900. In one embodiment, a user interacts with device 900 by providing audio commands that are received and processed by processor 910.

Display subsystem 930 represents hardware (e.g., display devices) and software (e.g., drivers) components that provide a visual and/or tactile display for a user to interact with the computing device. Display subsystem 930 includes display interface 932, which includes the particular screen or hardware device used to provide a display to a user. In one embodiment, display interface 932 includes logic separate from processor 910 to perform at least some processing related to the display. In one embodiment, display subsystem 930 includes a touchscreen device that provides both output and input to a user.

I/O controller 940 represents hardware devices and software components related to interaction with a user. I/O controller 940 can operate to manage hardware that is part of audio subsystem 920 and/or display subsystem 930. Additionally, I/O controller 940 illustrates a connection point for additional devices that connect to device 900 through which a user might interact with the system. For example, devices that can be attached to device 900 might include microphone devices, speaker or stereo systems, video systems or other display device, keyboard or keypad devices, or other I/O devices for use with specific applications such as card readers or other devices.

As mentioned above, I/O controller 940 can interact with audio subsystem 920 and/or display subsystem 930. For example, input through a microphone or other audio device can provide input or commands for one or more applications or functions of device 900. Additionally, audio output can be provided instead of or in addition to display output. In another example, if display subsystem includes a touchscreen, the display device also acts as an input device, which can be at least partially managed by I/O controller 940. There can also be additional buttons or switches on device 900 to provide I/O functions managed by I/O controller 940.

In one embodiment, I/O controller 940 manages devices such as accelerometers, cameras, light sensors or other environmental sensors, gyroscopes, global positioning system (GPS), or other hardware that can be included in device 900. The input can be part of direct user interaction, as well as providing environmental input to the system to influence its operations (such as filtering for noise, adjusting displays for brightness detection, applying a flash for a camera, or other features). In one embodiment, device 900 includes power management 950 that manages battery power usage, charging of the battery, and features related to power saving operation.

Memory subsystem 960 includes memory device(s) 962 for storing information in device 900. Memory subsystem 960 can include nonvolatile (state does not change if power to the memory device is interrupted) and/or volatile (state is indeterminate if power to the memory device is interrupted) memory devices. Memory 960 can store application data, user data, music, photos, documents, or other data, as well as system data (whether long-term or temporary) related to the execution of the applications and functions of system 900. In one embodiment, memory subsystem 960 includes memory controller 964 (which could also be considered part of the control of system 900, and could potentially be considered part of processor 910). Memory controller 964 includes a scheduler to generate and issue commands to memory device 962.

Connectivity 970 includes hardware devices (e.g., wireless and/or wired connectors and communication hardware) and software components (e.g., drivers, protocol stacks) to enable device 900 to communicate with external devices. The external device could be separate devices, such as other computing devices, wireless access points or base stations, as well as peripherals such as headsets, printers, or other devices.

Connectivity 970 can include multiple different types of connectivity. To generalize, device 900 is illustrated with cellular connectivity 972 and wireless connectivity 974. Cellular connectivity 972 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 974 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 980 include hardware interfaces and connectors, as well as software components (e.g., drivers, protocol stacks) to make peripheral connections. It will be understood that device 900 could both be a peripheral device ("to" 982) to other computing devices, as well as have peripheral devices ("from" 984) connected to it. Device 900 commonly has a "docking" connector to connect to other computing devices for purposes such as managing (e.g., downloading and/or uploading, changing, synchronizing) content on device 900. Additionally, a docking connector can allow device 900 to connect to certain peripherals that allow device 900 to control content output, for example, to audiovisual or other systems.

In addition to a proprietary docking connector or other proprietary connection hardware, device 900 can make peripheral connections 980 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 900 includes solid state LIDAR 990. In one embodiment, LIDAR 990 is a system that includes one or more chips, which allows the LIDAR to perform non-mechanical beam forming/steering of a light signal to perform 3D imaging. In one embodiment, LIDAR 990 can be a single chip that is packaged together with other components of system 900. In one embodiment, LIDAR 990 sends imaging information (which can include reference signals) to processor 910 for processing. LIDAR 990 can include a LIDAR engine circuit in accordance with any embodiment described herein, and enables system 900 for a variety of different imaging applications.

In one aspect, a circuit device includes an array of waveguides in a substrate coupled to a splitter that splits source light into the array of waveguides; an insulating layer on the substrate, the insulating layer having an opening to expose a portion of a path of the array of waveguides; and a liquid crystal layer on the insulating layer and on the portion of the path of the array of waveguides exposed by the opening in the insulating layer, wherein application of voltage to the liquid crystal changes relative phase of all waveguides in the array of waveguides exposed by the opening in the insulating layer.

In one embodiment, the substrate comprises a silicon substrate. In one embodiment, the insulating layer comprises an oxide layer. In one embodiment, the liquid crystal layer comprises a liquid crystal on silicon (LCOS) layer. In one embodiment, the opening comprises a triangular shaped opening across the array of waveguides, where the triangular shaped opening has its apex nearest one waveguide, and the triangular shape exposes more of each subsequently adjacent waveguide to provide an increasing phase shift across the waveguides of the array. In one embodiment, the circuit device further comprising: a coupler integrated in the substrate to receive light from the array of waveguides and couple the light through the liquid crystal layer. In one embodiment, the coupler comprises a grating coupler. In one embodiment, the coupler comprises a mirror coupler. In one embodiment, the circuit device further comprising: one or more angled facets over the coupler to spread the light. In one embodiment, the one or more angled facets comprise one or more angled facets in the insulating layer. In one embodiment, the one or more angled facets comprise one or more angled facets in the liquid crystal layer. In one embodiment, the circuit device further comprising: a modulator prior to the splitter to modulate the source light received from a laser source. In one embodiment, the circuit device further comprising: a laser device integrated in the substrate to generate the source light to pass through the splitter into the array of waveguides.

In one aspect, an integrated photonic chip includes an array of waveguides integrated in a substrate; a splitter integrated in the substrate to receive source light from a laser and split the source light into the array of waveguides; an insulating layer on the substrate, the insulating layer having an opening to expose a portion of a path of the array of waveguides; a liquid crystal layer on the insulating layer and on the portion of the path of the array of waveguides exposed by the opening in the insulating layer, wherein application of voltage to the liquid crystal changes relative phase of all waveguides in the array of waveguides exposed by the opening in the insulating layer; and photodetectors integrated in the substrate to receive light from the waveguides as a reference signal to compare against detected far field scattered light.

In one embodiment, the substrate comprises a silicon substrate. In one embodiment, the insulating layer comprises an oxide layer. In one embodiment, the liquid crystal layer comprises a liquid crystal on silicon (LCOS) layer. In one embodiment, the opening comprises a triangular shaped opening across the array of waveguides, where the triangular shaped opening has its apex nearest one waveguide, and the triangular shape exposes more of each subsequently adjacent waveguide to provide an increasing phase shift across the waveguides of the array. In one embodiment, the integrated photonic chip further comprising: a photodetector that taps off the source light prior to the splitter as a reference signal. In one embodiment, the integrated photonic chip further comprising: a coupler integrated in the substrate to receive light from the array of waveguides and couple the light through the liquid crystal layer. In one embodiment, the integrated photonic chip further comprising: a photodetector that taps off light at the coupler as a reference signal. In one embodiment, the coupler comprises a grating coupler. In one embodiment, the coupler comprises a mirror coupler. In one embodiment, the photonic chip further comprising: one or more angled facets over the coupler to spread the light. In one embodiment, the one or more angled facets comprise one or more angled facets in the oxide layer. In one embodiment, the one or more angled facets comprise one or more angled facets in the liquid crystal layer. In one embodiment, the photonic chip further comprising: a modulator prior to the splitter to modulate the source light received from a laser source. In one embodiment, the photonic chip further comprising: a laser device integrated in the substrate to generate the source light received at the splitter.

In one aspect, a method includes receiving source light at a splitter integrated in a substrate; splitting the source light with the splitter into an array of waveguides integrated in the substrate, to pass the source light through a waveguide path that includes an opening in an insulating layer integrated on the substrate and expose the array of waveguides to a liquid crystal layer integrated on the insulating layer; dynamically adjusting a phase of light in waveguides of the array by applying a voltage to the liquid crystal layer; and transmitting the phase adjusted light from the waveguides to a target object.

In one embodiment, dynamically adjusting the phase comprises applying a voltage to the liquid crystal layer to generate a phase ramp across the waveguides. In one embodiment, the liquid crystal layer comprises a liquid crystal on silicon (LCOS) layer. In one embodiment, dynamically adjusting the phase comprises beam steering the source light across an imaging field. In one embodiment, the substrate comprises a silicon substrate. In one embodiment, the insulating layer comprises an oxide layer. In one embodiment, the opening comprises a triangular shaped opening across the array of waveguides, where the triangular shaped opening has its apex nearest one waveguide, and the triangular shape exposes more of each subsequently adjacent waveguide to provide an increasing phase shift across the waveguides of the array. In one embodiment, the method further comprising: tapping off the source light with a photodetector prior to the splitter as a reference signal. In one embodiment, the method further comprising: receiving light from the array of waveguides with a coupler integrated in the substrate to receive light from the array of waveguides and couple the light through the liquid crystal layer. In one embodiment, the method further comprising: tapping off light with a photodetector at the coupler as a reference signal. In one embodiment, the coupler comprises a grating coupler. In one embodiment, the coupler comprises a mirror coupler. In one embodiment, the method further comprising: spreading the light with one or more angled facets over the coupler. In one embodiment, the one or more angled facets comprise one or more angled facets in the oxide layer. In one embodiment, the one or more angled facets comprise one or more angled facets in the liquid crystal layer. In one embodiment, the method further comprising: modulating the source light received from a laser source. In one embodiment, the method further comprising: generating the source light with a laser device integrated in the substrate.

In one aspect, an article of manufacture comprising a computer readable storage medium having content stored thereon, which when executed performs operations for light detection and ranging, including: receiving source light at a splitter integrated in a substrate; splitting the source light with the splitter into an array of waveguides integrated in the substrate, to pass the source light through a waveguide path that includes an opening in an insulating layer integrated on the substrate and expose the array of waveguides to a liquid crystal layer integrated on the insulating layer; dynamically adjusting a phase of light in waveguides of the array by applying a voltage to the liquid crystal layer; and transmitting the phase adjusted light from the waveguides to a target object.

In one embodiment, the content for dynamically adjusting the phase comprises content for applying a voltage to the liquid crystal layer to generate a phase ramp across the waveguides. In one embodiment, the liquid crystal layer comprises a liquid crystal on silicon (LCOS) layer. In one embodiment, the content for dynamically adjusting the phase comprises content for beam steering the source light across an imaging field. In one embodiment, the substrate comprises a silicon substrate. In one embodiment, the insulating layer comprises an oxide layer. In one embodiment, the opening comprises a triangular shaped opening across the array of waveguides, where the triangular shaped opening has its apex nearest one waveguide, and the triangular shape exposes more of each subsequently adjacent waveguide to provide an increasing phase shift across the waveguides of the array. In one embodiment, the article of manufacture further comprising content for tapping off the source light with a photodetector prior to the splitter as a reference signal. In one embodiment, the article of manufacture further comprising content for receiving light from the array of waveguides with a coupler integrated in the substrate to receive light from the array of waveguides and couple the light through the liquid crystal layer. In one embodiment, the article of manufacture further comprising content for tapping off light with a photodetector at the coupler as a reference signal. In one embodiment, the coupler comprises a grating coupler. In one embodiment, the coupler comprises a mirror coupler. In one embodiment, the article of manufacture further comprising content for spreading the light with one or more angled facets over the coupler. In one embodiment, the one or more angled facets comprise one or more angled facets in the oxide layer. In one embodiment, the one or more angled facets comprise one or more angled facets in the liquid crystal layer. In one embodiment, the article of manufacture further comprising content for modulating the source light received from a laser source. In one embodiment, the article of manufacture further comprising content for generating the source light with a laser device integrated in the substrate.

In one aspect, an apparatus for light detection and ranging, includes means for splitting source light into an array of waveguides integrated in a substrate, to pass the source light through a waveguide path that includes an opening in an insulating layer integrated on the substrate and expose the array of waveguides to a liquid crystal layer integrated on the insulating layer; means for dynamically adjusting a phase of light in waveguides of the array by applying a voltage to the liquid crystal layer; and means for transmitting the phase adjusted light from the waveguides to a target object.

In one embodiment, the means for dynamically adjusting the phase comprises means for applying a voltage to the liquid crystal layer to generate a phase ramp across the waveguides. In one embodiment, the liquid crystal layer comprises a liquid crystal on silicon (LCOS) layer. In one embodiment, the means for dynamically adjusting the phase comprises means for beam steering the source light across an imaging field. In one embodiment, the substrate comprises a silicon substrate. In one embodiment, the insulating layer comprises an oxide layer. In one embodiment, the opening comprises a triangular shaped opening across the array of waveguides, where the triangular shaped opening has its apex nearest one waveguide, and the triangular shape exposes more of each subsequently adjacent waveguide to provide an increasing phase shift across the waveguides of the array. In one embodiment, the apparatus further comprising: means for tapping off the source light with a photodetector prior to the splitter as a reference signal. In one embodiment, the apparatus further comprising: coupling means for receiving light from the array of waveguides to couple the light through the liquid crystal layer. In one embodiment, the apparatus further comprising: means for tapping off light with a photodetector at the coupler as a reference signal. In one embodiment, the coupling means comprises a grating coupler. In one embodiment, the coupler comprises a mirror coupler. In one embodiment, the apparatus further comprising: means for spreading the light with one or more angled facets over the coupler. In one embodiment, the one or more angled facets comprise one or more angled facets in the oxide layer. In one embodiment, the one or more angled facets comprise one or more angled facets in the liquid crystal layer. In one embodiment, the apparatus further comprising: means for modulating the source light received from a laser source. In one embodiment, the apparatus further comprising: means for generating the source light with a laser device integrated in the substrate.

In one aspect, an apparatus for light detection and ranging, includes means for splitting source light into an array of waveguides integrated in a substrate, to pass the source light through a waveguide path; means for dynamically adjusting a phase of light in waveguides of the array by applying a voltage to a liquid crystal layer integrated on waveguides of the substrate; and means for transmitting the phase adjusted light from the waveguides to a target object.

In one embodiment, the means for dynamically adjusting the phase comprises means for applying a voltage to the liquid crystal layer to generate a phase ramp across the waveguides. In one embodiment, the liquid crystal layer comprises a liquid crystal on silicon (LCOS) layer. In one embodiment, the means for dynamically adjusting the phase comprises means for beam steering the source light across an imaging field. In one embodiment, the substrate comprises a silicon substrate. In one embodiment, the means for dynamically adjusting the phase comprises an opening across the array of waveguides, where the triangular shaped opening has its apex nearest one waveguide, and the triangular shape exposes more of each subsequently adjacent waveguide to provide an increasing phase shift across the waveguides of the array. In one embodiment, the apparatus further comprising: means for tapping off the source light with a photodetector prior to the splitter as a reference signal. In one embodiment, the apparatus further comprising: coupling means for receiving light from the array of waveguides to couple the light through the liquid crystal layer. In one embodiment, the apparatus further comprising: means for tapping off light with a photodetector at the coupler as a reference signal. In one embodiment, the coupling means comprises a grating coupler. In one embodiment, the coupler comprises a mirror coupler. In one embodiment, the apparatus further comprising: means for spreading the light with one or more angled facets over the coupler. In one embodiment, the one or more angled facets comprise one or more angled facets in the oxide layer. In one embodiment, the one or more angled facets comprise one or more angled facets in the liquid crystal layer. In one embodiment, the apparatus further comprising: means for modulating the source light received from a laser source. In one embodiment, the apparatus further comprising: means for generating the source light with a laser device integrated in the substrate.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A circuit device comprising:
   an array of waveguides in a substrate coupled to a splitter that splits source light into the array of waveguides;
   an insulating layer on the substrate, the insulating layer having an opening to expose a portion of a path of the array of waveguides;
   a liquid crystal layer on the insulating layer and on the portion of the path of the array of waveguides exposed by the opening in the insulating layer, wherein a voltage across the liquid crystal layer is to cause a greater phase shift in a given waveguide relative to another waveguide in the array of waveguides exposed by the opening in the insulating layer; and
   a coupler integrated in the substrate to receive light from the array of waveguides and couple the light through the liquid crystal layer.

2. The circuit device of claim 1, wherein the substrate comprises a silicon substrate.

3. The circuit device of claim 1, wherein the insulating layer comprises an oxide layer.

4. The circuit device of claim 1, wherein the liquid crystal layer comprises a liquid crystal on silicon (LCOS) layer.

5. The circuit device of claim 1, wherein the opening comprises a triangular shaped opening across the array of waveguides, where the triangular shaped opening has its apex nearest one waveguide, and the triangular shape exposes more of each subsequently adjacent waveguide to provide an increasing phase shift across the waveguides of the array.

6. The circuit device of claim 1, wherein the coupler comprises a grating coupler.

7. The circuit device of claim 1, wherein the coupler comprises a mirror coupler.

8. The circuit device of claim 1, further comprising: one or more angled facets over the coupler to spread the light.

9. The circuit device of claim 1, further comprising:
   a modulator prior to the splitter to modulate the source light received from a laser source.

10. The circuit device of claim 1, further comprising:
    a laser device integrated in the substrate to generate the source light to pass through the splitter into the array of waveguides.

11. The circuit device of claim 8, wherein the one or more angled facets comprise one or more angled facets in the insulating layer.

12. The circuit device of claim 8, wherein the one or more angled facets comprise one or more angled facets in the liquid crystal layer.

13. An integrated photonic chip comprising:
    an array of waveguides integrated in a substrate;
    a splitter integrated in the substrate to receive source light from a laser and split the source light into the array of waveguides;
    an insulating layer on the substrate, the insulating layer having an opening to expose a portion of a path of the array of waveguides;
    a liquid crystal layer on the insulating layer and on the portion of the path of the array of waveguides exposed by the opening in the insulating layer, wherein a voltage across the liquid crystal layer is to cause a greater phase shift in a given waveguide relative to another waveguide in the array of waveguides exposed by the opening in the insulating layer; and
    photodetectors integrated in the substrate to receive light from the waveguides as a reference signal to compare against detected far field scattered light.

14. The integrated photonic chip of claim 13, wherein the opening comprises a triangular shaped opening across the array of waveguides, where the triangular shaped opening has its apex nearest one waveguide, and the triangular shape exposes more of each subsequently adjacent waveguide to provide an increasing phase shift across the waveguides of the array.

15. The integrated photonic chip of claim 13, further comprising:

a photodetector that taps off the source light as a reference signal.

16. The integrated photonic chip of claim 13, further comprising:
one or more angled facets over a coupler to spread the light.

17. The integrated photonic chip of claim 13, further comprising:
a laser device integrated in the substrate to generate the source light received at the splitter.

18. A circuit device comprising:
an array of waveguides in a substrate coupled to a splitter that splits source light into the array of waveguides;
an insulating layer on the substrate, the insulating layer having an opening to expose a portion of a path of the array of waveguides, wherein the opening is to expose more of a given waveguide than an adjacent waveguide of the array of waveguides; and
a liquid crystal layer on the insulating layer and on the portion of the path of the array of waveguides exposed by the opening in the insulating layer, wherein a voltage across the liquid crystal layer is to cause a greater phase shift in the given waveguide than the adjacent waveguide of the array based on greater exposure of the given waveguide, relative to the adjacent waveguide, to the liquid crystal layer through the opening in the insulating layer.

19. The circuit device of claim 18, wherein the opening comprises a triangular shaped opening across the array of waveguides, wherein an apex of the triangular shaped opening is disposed further from the given waveguide than the adjacent waveguide.

\* \* \* \* \*